Nov. 17, 1925.  
C. A. MASH  
1,562,110  
NAIL CUTICLE TOOL POINT  
Filed July 22, 1925

Inventor  
Charles A. Mash,  
by Hazard and Miller  
Attorneys

Witness:  
W. R. Hall.

Patented Nov. 17, 1925.

1,562,110

UNITED STATES PATENT OFFICE.

CHARLES A. MASH, OF LOS ANGELES, CALIFORNIA, ASSIGNOR TO THE ELECTRIC MANICURING CO., OF LOS ANGELES, CALIFORNIA, A CORPORATION OF CALIFORNIA.

NAIL-CUTICLE TOOL POINT.

Application filed July 22, 1925. Serial No. 45,253.

*To all whom it may concern:*

Be it known that I, CHARLES A. MASH, a citizen of the United States, residing at Los Angeles, in the county of Los Angeles and State of California, have invented new and useful Improvements in Nail-Cuticle Tool Points, of which the following is a specification.

This invention is a tool point adapted to be employed in connection with a rotatable tool holder for providing a rotary tool point.

It is the object of the invention to provide a tool employed in manicuring the nails, either finger or toe nails, said tool having a point adapted to be inserted beneath the cuticle for loosening the same and also having fluted sides adapted to push back the cuticle when loosened. The point of the tool, which may be covered with cotton, is also adapted to be inserted beneath the nails so as to apply the usual bleaching for cleaning and whitening the surface beneath the nails.

It is a further object of the invention to provide a tool which by means of a conical shaped tool provides in an integral structure both the pointed member and the fluted member for the purposes above set forth.

Figure 1:
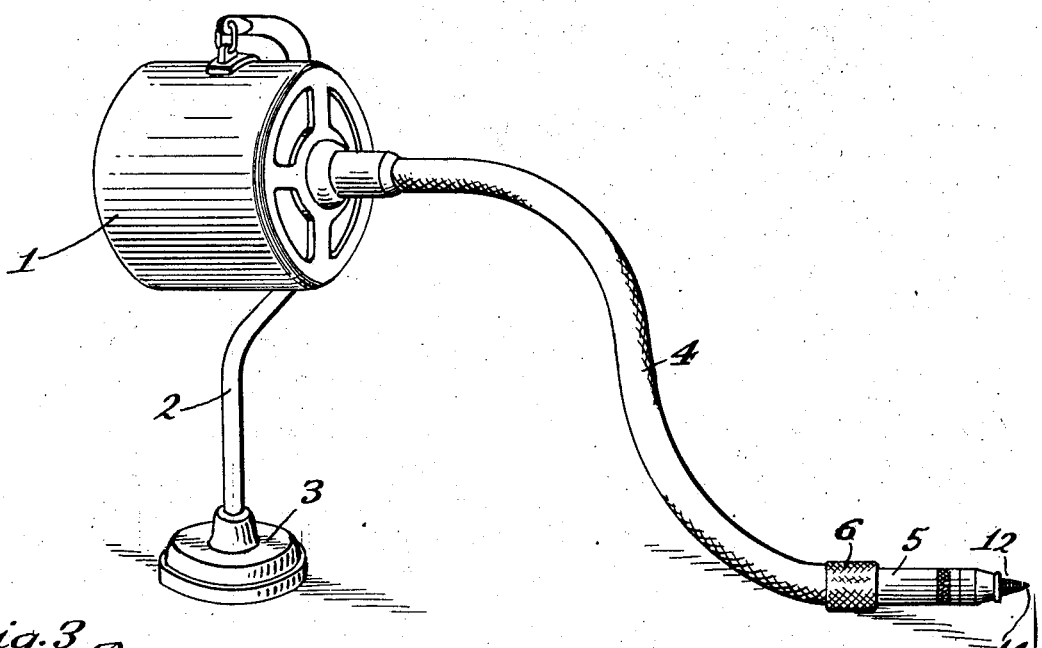
Figure 3:
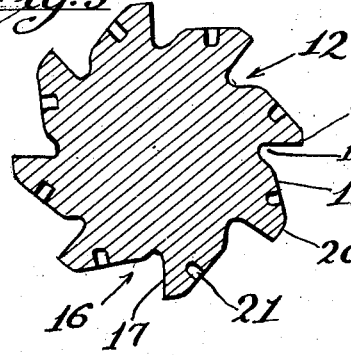
Figure 2:
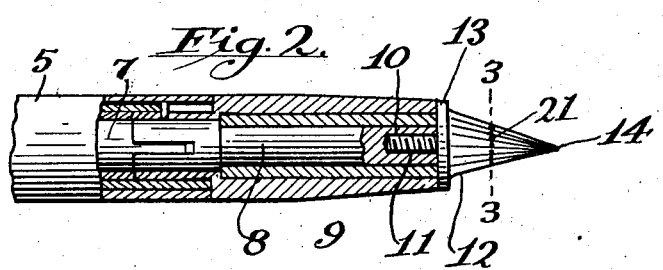
Figure 4:
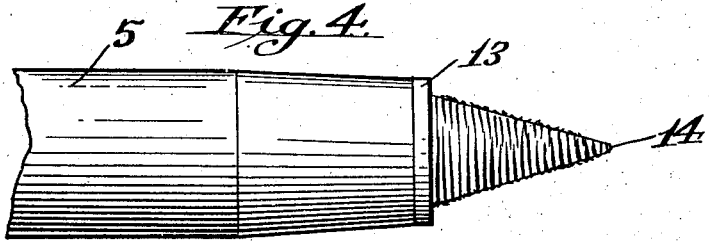

With the foregoing and other objects in view which will be made manifest in the following detailed description and specifically pointed out in the appended claims, reference is had to the accompanying drawings for an illustrative embodiment of the invention, wherein:

Figure 1 is a perspective view of a rotary tool holder having the improved tool point employed in connection therewith, Fig. 2 is a side elevation through the improved tool holder and tool point, parts being broken away and shown in vertical section, Fig. 3 is a vertical section upon an enlarged scale taken upon the line 3—3 of Fig. 2, and Fig. 4 is a side elevation of the improved tool holder and tool point illustrating the manner in which it is prepared for use.

The improved tool point may be employed in connection with the rotary tool holder, which, for the purpose of illustration, is shown as comprising an electric motor 1 suspended from a bracket arm 2 mounted upon a suitable base 3. The motor is provided with a flexible shaft within a casing 4 and a tool holder 5 is mounted upon the end of the flexible shaft, said tool holder having an outer non-rotatable casing 6 and an inner rotatable shaft 7 arranged to detachably engage the shank 8 of the improved tool point. The shank 8 is preferably journaled in casing 6 as by a bearing collar 9.

The improved tool point is mounted upon the end of the shank 8 for rotation therewith and is, preferably, detachably connected to said shank as by providing the tool point with a threaded shank 10 received within a corresponding threaded aperture 11 in the shank 8.

The improved tool point consists essentially of a tapered member terminating in a point arranged for loosening the cuticle of a nail and for insertion beneath the nail, when covered with cotton impregnated with nail bleaching material for cleaning and bleaching the surface beneath said nail. The tapering sides of this point are provided with edges arranged for pushing back the cuticle of a nail.

Referring specifically to the construction of the tool point as illustrated in the present embodiment of the invention, the tapering member is shown as a conical member 12 terminating at its base in an enlarged shoulder 13 adapted to abut against the end of the tool holder with the shank 10 projecting rearwardly from said shoulder. The apex of the conical member 12 is, preferably, a relatively sharp point as shown at 14. When the tool point is rotated the point 14 thereof is adapted to be forced under the cuticle of a nail substantially at right angles to the cuticle so that said tapering point will loosen the cuticle from the nail. The sides of the conical member 12 are provided with edges 15 extending longitudinally of said taper.

When the tool point is rotated the tapering sides of the same are forced against the cuticle of a nail which has been loosened by the point of the tool, as previously described and as clearly shown in Fig. 2, and the edges 15 of the conical tool point will then extend substantially parallel to the cuticle of the nail and are adapted to push back said cuticle. The edges 15 are preferably formed by notching the sides of the conical member, as shown at 16. One side of these notches, preferably, extends radially of the conical member as shown at 17.

At the base or the inner end of the side 17 there is formed a groove 18 and the other side of each notch, as indicated at 19, extends outwardly and gradually curves into the curvature of the periphery of the conical member as shown at 20. The notches 16 are preferably so spaced apart circumferentially of the conical member as to leave an appreciable portion of the periphery of the member between the side 19 and the edge 15 formed by the side 17 of the next adjacent notch. On each of the sides 19 of the notches 16 a small aperture or recess 21 is formed, these recesses being arranged approximately at the longitudinal center of the tool point. These recesses 21 together with the grooves 18 facilitate the application of the cotton to the point and aid in maintaining it thereon.

Thus it will be seen that when the tool point is rotated toward the right hand or clock-wise, the edges 15 extending substantially parallel to the edge of the cuticle of a nail will impinge against the edge of the cuticle and thereby force back said cuticle.

It will be observed that the construction, as thus set forth, combines in a single tool pointed means for loosening the cuticle and applying bleaching beneath the nails, as well as tapering edges extending rearwardly from said point for forcing back the cuticle when thus loosened.

It will be understood that various changes in the detail of construction may be made without departing from the spirit or scope of the invention as defined by the appended claims.

I claim:

1. A manicuring tool comprising an elongated conical body having a pointed apex, an outwardly projecting flange at the base of said conical body, and the surface of said conical body being provided with longitudinally disposed grooves.

2. A manicuring tool comprising an elongated conical body portion having a pointed apex, a flange projecting outwardly from the base of said conical body portion, the surface of said body portion being provided with longitudinally disposed ribs, and a threaded shank projecting from the base of said conical body.

3. A manicuring tool comprising an elongated conical body having a pointed apex, there being notches formed longitudinally upon the peripheral surface of the body, said body being provided with a threaded shank.

4. A manicuring tool comprising a conical body having a pointed apex, a shank upon said body, there being notches formed upon said body, each notch defining a side which is radial from the axis of the body, there being a groove at the base of the side, the other side extending outwardly from the top of the groove and merging into the peripheral surface of the body.

5. A manicuring tool comprising a conical body having a pointed apex, on the peripheral surface of which longitudinal notches are formed, one side of each notch being radial from the surface of the body and the other side being inclined toward the next adjacent notch, each of the last mentioned sides having recesses formed therein as and for the purpose described.

In testimony whereof I have signed my name to this specification.

CHAS. A. MASH.